United States Patent (10) Patent No.: US 11,151,643 B1
Anerella et al. (45) Date of Patent: Oct. 19, 2021

(54) ONLINE MULTI-USER SHOPPING

(71) Applicant: Verishop Inc., Santa Monica, CA (US)

(72) Inventors: Jessica Marie Anerella, Brooklyn, NY (US); Imran Khan, Dallas, TX (US); Rong Yan, Santa Monica, CA (US); ChingYao Yu, San Francisco, CA (US); Liu Liu, San Francisco, CA (US)

(73) Assignee: Verishop Inc., Santa Monica, CA (US)

( * ) Notice: Subject to any disclaimer, the term of this patent is extended or adjusted under 35 U.S.C. 154(b) by 0 days.

(21) Appl. No.: 17/209,462

(22) Filed: Mar. 23, 2021

Related U.S. Application Data

(60) Provisional application No. 63/125,320, filed on Dec. 14, 2020.

(51) Int. Cl.
*G06Q 30/00* (2012.01)
*G06Q 30/06* (2012.01)
*H04L 12/58* (2006.01)
*G06Q 30/02* (2012.01)

(52) U.S. Cl.
CPC ..... *G06Q 30/0643* (2013.01); *G06Q 30/0239* (2013.01); *G06Q 30/0633* (2013.01); *H04L 51/046* (2013.01); *H04L 51/10* (2013.01)

(58) Field of Classification Search
CPC .......... G06Q 30/0643; G06Q 30/0239; G06Q 30/0633
See application file for complete search history.

(56) References Cited

U.S. PATENT DOCUMENTS

| 6,901,379 | B1 * | 5/2005 | Balter ............... G06Q 30/06 434/395 |
| 7,970,661 | B1 | 6/2011 | Abraham et al. |
| 8,739,044 | B1 | 5/2014 | Varadarajan |
| 10,096,050 | B2 * | 10/2018 | Purcell ............ G06Q 30/0605 |
| 2005/0096997 | A1 * | 5/2005 | Jain ................ G06Q 30/0601 705/26.1 |
| 2012/0185355 | A1 | 7/2012 | Kilroy |
| 2015/0006308 | A1 | 1/2015 | Lin |

(Continued)

FOREIGN PATENT DOCUMENTS

| WO | 2010135274 A2 | 11/2010 |
| WO | 2018020561 A1 | 2/2018 |

OTHER PUBLICATIONS

Srivastava, Supriya: "Multi User Customer Account for Shopify", Published Aug. 3, 2020; www.webkul.com/blog/multi-user-customer-account-for-shopify—Accessed Dec. 4, 2020, 23pages.*

(Continued)

*Primary Examiner* — Kathleen Palavecino
(74) *Attorney, Agent, or Firm* — Culhane Meadows PLLC; Stephen J. Weed

(57) ABSTRACT

A multi-user shopping experience that allows users to converse and exchange ideas in a group setting while shopping. Through a browser or an application (e.g., on a mobile device), users are able converse with other shoppers, exchange ideas, select items, view items selected by other users, and make purchases. Additionally, each user is notified of other users' activities (e.g., viewing a collective shopping bin or browsing web pages in an on-line marketplace). Furthermore, incentives (such as discounts or free gifts) are provided to users in the group.

20 Claims, 13 Drawing Sheets

(56) References Cited

U.S. PATENT DOCUMENTS

2015/0324878 A1 11/2015 Shorter
2016/0155162 A1 6/2016 Gagnon-Volles

OTHER PUBLICATIONS shopify.com: "Group Charts & Chat Rooms by Cartonomy", www.apps.shopify.com/cartonomy—Accessed Dec. 4, 2020, 2 pages.
shopify.com: "Jioukou Group Buying by YOSGO", www.apps.shopify.com/jioukou—Accessed Dec. 4, 2020, 2 pages.
Srivastava, Supriya: "Multi User Customer Account for Shopify", Published Aug. 13, 2020; www.webkul.com/blog/multi-user-customer-account-for-shopify—Accessed Dec. 4, 2020, 23 pages.

* cited by examiner

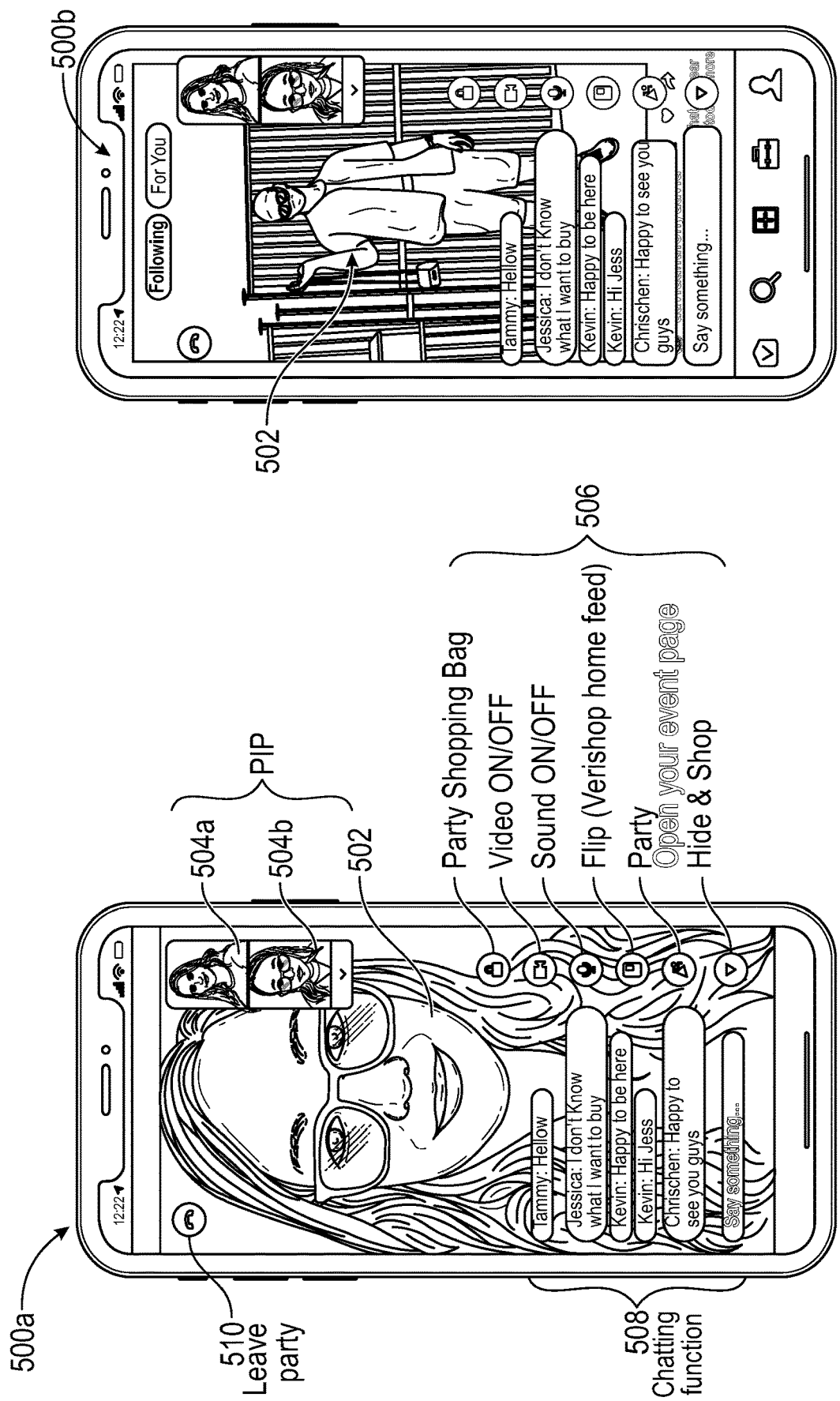

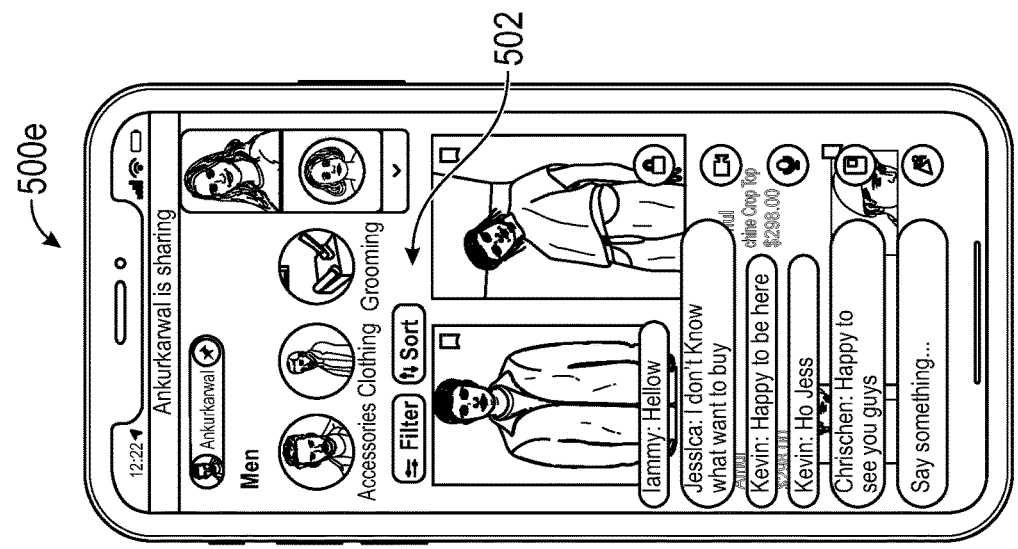
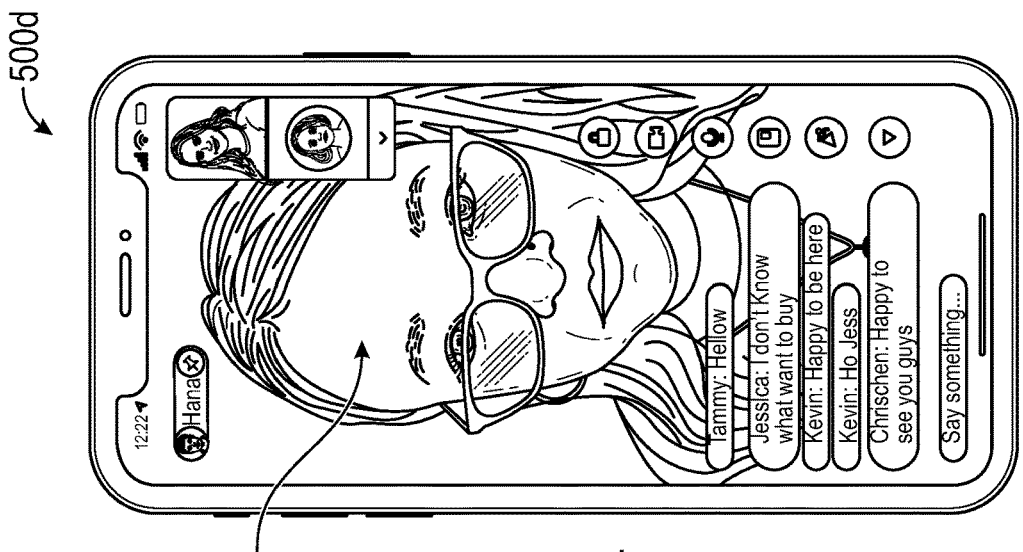
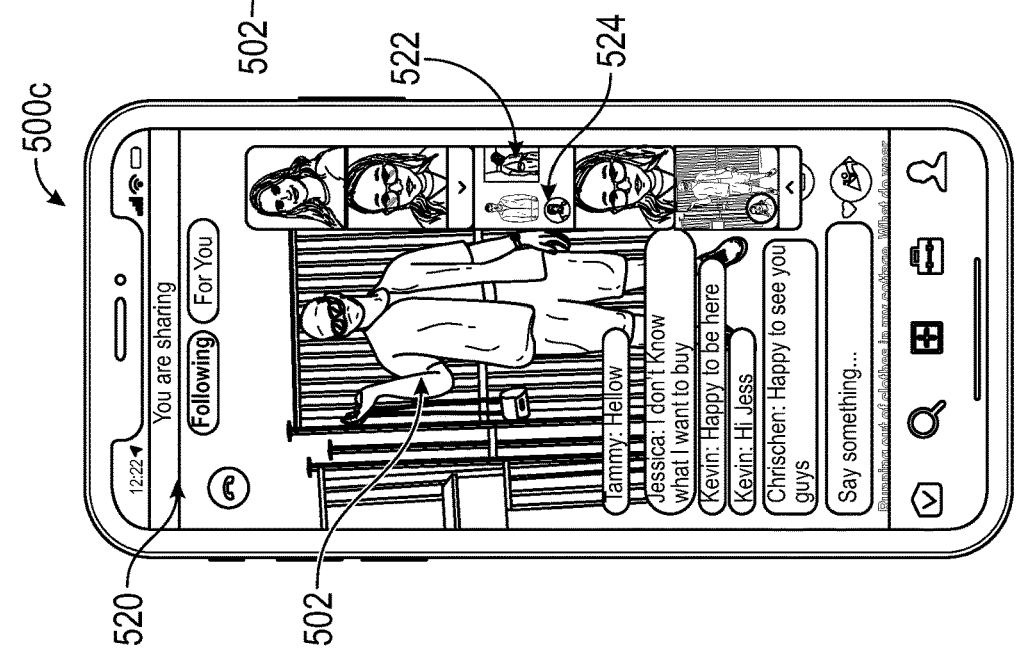
FIG. 5C
FIG. 5D
FIG. 5E

US 11,151,643 B1

ONLINE MULTI-USER SHOPPING

TECHNICAL FIELD

Examples set forth in this disclosure relate generally to applications running on client devices and server systems supporting those devices. More particularly, but not by way of limitation, this disclosure addresses systems and methods for enabling remotely located users to shop together in an on-line marketplace.

BACKGROUND

On-line marketplaces enable remotely located individual users to purchase items using an electronic device such as a home computer or a mobile device. In conventional systems, the users access the on-line marketplaces through web browsers or applications (apps) running on their electronic devices. The users are able to navigate screens presented by the on-line marketplaces for viewing via their browsers or apps. The screens include items available for purchase from the online marketplace. The users may select and purchase these items through the on-line marketplace.

BRIEF DESCRIPTION OF THE DRAWINGS

The disclosed subject matter is best understood from the following detailed description when read in connection with the accompanying drawings, with like elements having the same reference numerals. When a plurality of similar elements is present, a single reference numeral may be assigned to the plurality of similar elements with a small letter designation referring to specific elements. When referring to the elements collectively or to a non-specific one or more of the elements, the small letter designation may be dropped. To easily identify the discussion of any particular element or act, the most significant digit or digits in a reference number refer to the figure number in which that element is first introduced. This emphasizes that according to common practice, the various features of the drawings are not drawn to scale unless otherwise indicated. On the contrary, the dimensions of the various features may be expanded or reduced for clarity. Included in the drawings are the following figures:

FIGS. 5A, 5B, 5C, 5D, and 5E of example graphical user interfaces (GUIs) presented on a display of a client-side electronic device.

DETAILED DESCRIPTION

Aspects of the subject matter disclosed herein are directed to a multi-user shopping experience that allows users in a group to converse and exchange ideas in a group setting while shopping. In one example, through an application (e.g., on an electronic device), each user is able to converse with other shoppers, exchange ideas, select items, view items selected by other users, and make purchases. Additionally, each user is notified of other users' activities (e.g., viewing a collective shopping bin or browsing web pages in an on-line marketplace). Furthermore, incentives (such as discounts or free gifts) may be provided to users in a group. The multi-user shopping experiences described herein enable a more engaging on-line shopping experience than is currently available through conventional on-line marketplaces, which do not provide details on the activities of each member of the group to all other members of the group.

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

Figure 1:
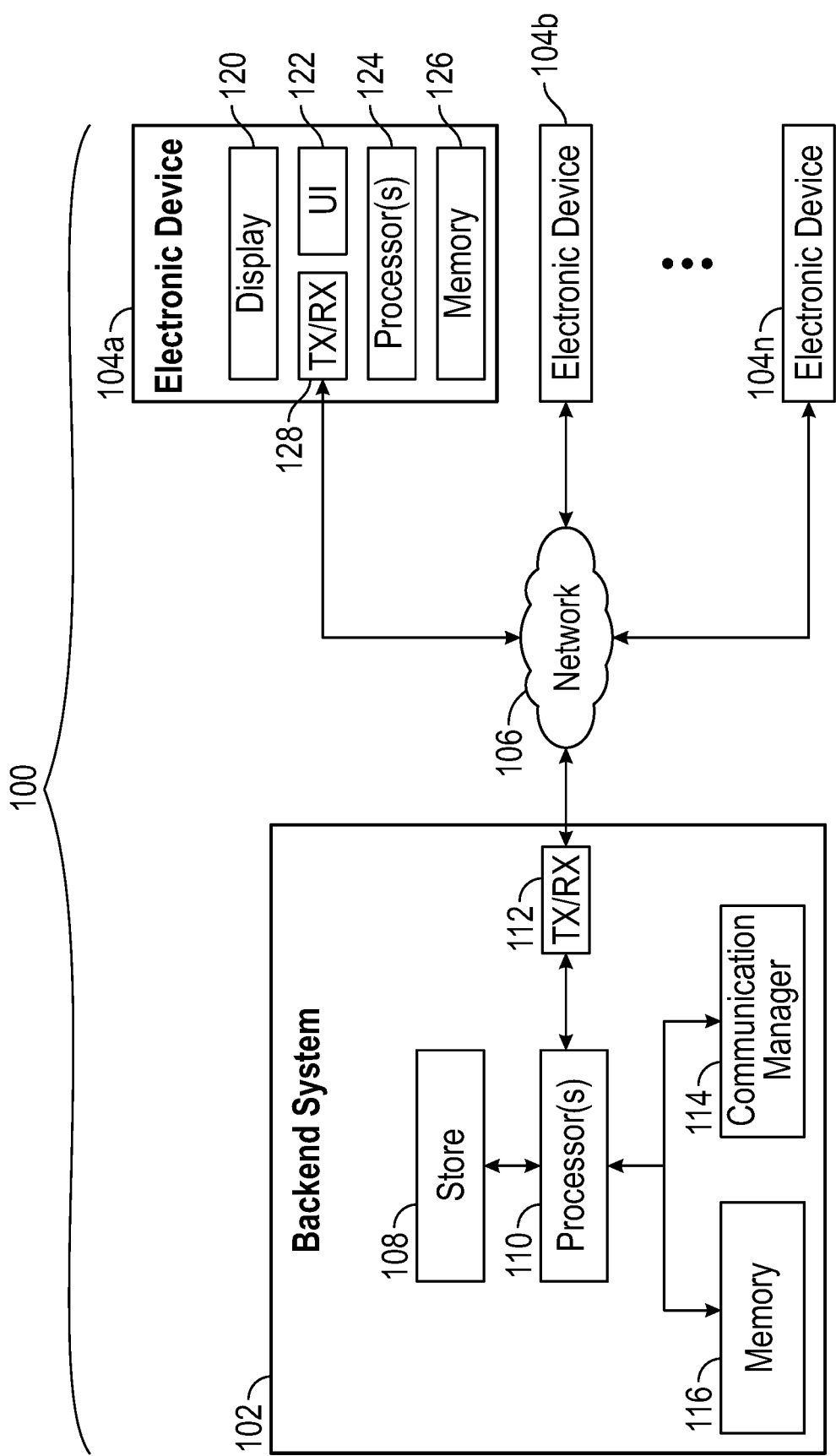
FIG. 1 is a block diagram of an example shopping system.

FIG. 1 is a block diagram illustrating a multi-user shopping system 100, according to some examples. The system 100 includes a backend system 102 providing access to items in an on-line store 108 and two or more client devices such as electronic devices 104*a-n* for accessing the on-line store 108. The backend system 102 additionally manages communication flow with the electronic devices 104 and between electronic devices to produce a multi-user collaborative shopping experience. Communications between the backend system 102 and the electronic device 104 occur over a network 106 such as the Internet. In one example, the communications take place through a full-service network gateway.

The backend system 102 includes a store 108, processor(s) 110, a transceiver (TX/RX) 112, a communication manager 114, and a memory 116. The store 108 is an online marketplace including items for purchase. In one example, the store 108 is a marketplace hosted by the provider of the backend system 102. In another example, the store 108 is a remote marketplace accessed by the backend system 102 via the network 106.

The TX/RX 112 handles communication between the backend system the electronic devices 104. The TX/RX 112 formats communications from the backend system into an appropriate format for transmission via the network 106 and interpretation by the electronic devices 104. The TX/RX 112 additionally interprets communications from the electronic devices 104 received via the network 106. A suitable TX/RX 112 is a conventional transceiver used in social media web server systems.

The communication manager 114 manages group data received from each of the electronic device 104 for delivery to each of the other electronic devices 104 in a shopping group. In one example, the communication manager 114 maintains a table (e.g., in memory 116) that includes address information for each of the electronic devices within a group. When data for dissemination to other group members (e.g., a communication, a camera capture frame, or a screen capture frame) is received from one of the electronic devices 114 (identified based on a source address), that information is communicated to the other members of the group at their associated addresses.

The processor(s) 110 are one or more processors for controlling the components of the backed end system 102. The memory 116 stores instructions for execution by the processor(s) 110 to provide the functionality of the backend system 102. The processor(s) 110 are coupled to the store 108, the TX/RX 112, the communication manager 114, and the memory 116. Suitable processors 110 and memory 116 are conventional processors and memory used in social media web server systems. In one example, the memory 116 may include cloud-based storage.

The backend system 102 additionally includes an application program interface (API) server and a web server that may be communicatively coupled with one or more database(s) maintained in memory 116. The one or more database(s) may be storage devices that store data (e.g., in a dataset) related to the user groups of the shopping system 100, applications associated with the backend system 102, cloud services, and so forth. The one or more database(s) may further store information related to electronic devices 104, client application(s), users, user groups, and so forth.

The illustrated electronic device 104a includes a display 120, a user interface 122, a processor(s) 124, a memory 126 and a transceiver 128. The electronic device 104 is configured to access a shopping platform such as a store 108 through the backend system 102 over the network 106. For example, the electronic devices 104 may be used to input information to create an account, exchange information with the backend system 102 over the network 106, and so forth. The electronic device 104 is additionally configured for communication (audio/video/textual) with other electronic device 104 with the group. In one example, the other electronic devices 104 are the same or similar to the electronic device 104a.

The display 120 is configurable to display information of the electronic device and received from the other electronic device. The display information of the electronic device includes camera frames captured by the electronic device (e.g., to provide the user with visual feedback on their appearance) and browser frames (e.g., to enable the user to view items for sale by the store 108 and to view a shopping bin including the carts of other users). The display information received from other electronic devices 104 includes camera frames or screen frames sent by those devices. The received camera frames and screen frames may be presented on the display 120 in a picture in picture (PIP) associated with the user from which those frames were received.

The electronic devices 104 include, but are not limited to, mobile phones, desktop computers, laptops, portable digital assistants (PDA), smart phones, tablets, ultrabooks, netbooks, laptops, or any other communication device that a user may utilize to access the backend system 102. The user interface (UI) 122 includes devices such as a touchscreen or a microphone through which the user can make selections and provide feedback.

The processor(s) 124 are one or more processors for controlling the components of the electronic device 104a. The memory 126 stores instructions for execution by the processor(s) 124 to provide the functionality of the electronic device 104a. The processor(s) 110 are coupled to the display 120, the user interface 122, the TX/RX 128, and the memory 126. The processor(s) 124 may include separate audio and video processors for processing audio and video signals generated or received by the electronic device 104a. Suitable processor(s) 124, memory 126, and TX/RX 128 are conventional processors, memory, and transceivers used in social media web server systems.

The electronic device 104a may access the various data and applications provided by other entities in the system 100 via a web client (e.g., a browser) and/or one or more client applications stored in memory 126 of the electronic device 104a. The electronic device 104a may include one or more client application(s) (also referred to as "apps") such as, but not limited to, a web browser, messaging application, an e-commerce site application (e.g., store 108 of the backend system 102), and the like.

Figure 2:
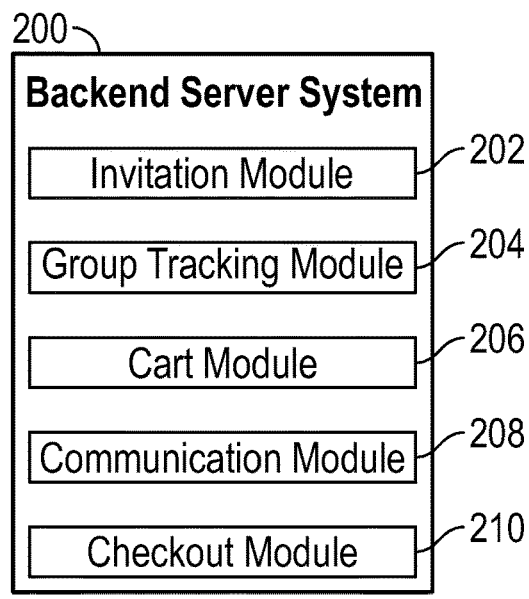
FIG. 2 is a block diagram illustrating an example backend server system of the shopping system of FIG. 1.

FIG. 2 is a block diagram illustrating modules of an example backend server system 200 of the shopping system 100. The backend server system 200 includes an invitation module 202, a group tracking module 204, a cart module 206, a communication module 208, and a checkout module 210. Each of the modules include instructions (e.g., for execution by processor 110) to configure the backend system 102 to provide the functionality described herein.

The invitation module 202 configures the backend system 102 to establish a multi-user shopping group (also referred to herein as a shopping party). The invitation module 202 receives shopping party details including host information (name and user ID), guest information (e.g., names and user IDs), and party details (e.g., date, start time, duration, theme, collection(s), etc.). The invitation module 202 stores the information in the memory 116, sends invites to the guests, and tracks RSVPs from the guests.

The group tracking module 204 tracks communications received from the host and guests (e.g., based on user IDs associated with communications). Additionally, the group tracking module 204 tracks purchases by the host and guests.

The cart module 206, maintains individual shopping carts for each of the party goers (host and guests) and a shopping bin that includes items selected by each of the party goers. The cart module maintains the items in the shopping bin separated by party goer, e.g., so each user can comment on the purchases of the others. In one example, the cart module retrieve select information from the individual shopping carts for including in the shopping bin, e.g., item image and description. In accordance with this example, some information is omitted, e.g., price and size information.

The communication module 208, establishes communication among the party goers. Communications (e.g., camera frames, video frames, text, and audio) received from each party goer is distributed to all other party goers. In one example, the communication module may receive a request from a user to establish a subset of users (e.g., that user and one other user) to exchange private communications. In accordance with this example, communications received from either of these users are only distributed to the other.

The checkout module 210 manages purchases by the party goers. The checkout module 210 presents a user with the contents of their shopping cart and purchase information when requested by the user. The checkout module 210 may additionally determine incentives (e.g., discounts and free gifts) and present the incentives to the user.

Figure 3:
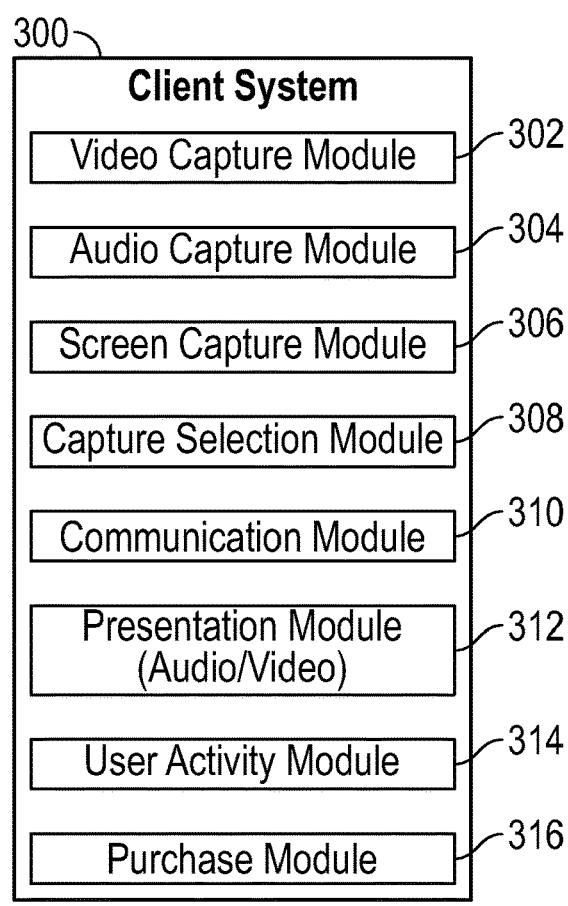
FIG. 3 is a block diagram illustrating an example client-side system of the shopping system of FIG. 1.

FIG. 3 is a block diagram illustrating modules of a client system 300 of the shopping system 100. The client system 300 includes a video capture module 302, an audio capture module 304, a screen capture module 306, a capture selection module 308, a communication module 310, a presentation module 312, a user activity module 314, and a purchase module 316. Each of the modules include instructions (e.g., for execution by processor 124) to configure the electronic devices 104 to provide the functionality described herein.

The video capture module 302, captures video at the electronic device 104. In one example, the video capture module 302 captures frames of images produced by a camera of the electronic device 104. The video capture module 302 may store the frames of images in the memory 126. In one example, the frames of images are images of the user of the electronic device 104.

The audio capture module 304, captures audio signals at the electronic device 104. In one example, the audio capture module 304 captures audio signals produced by a microphone of the electronic device 104. The audio capture module 304 may store the audio signals in the memory 126. In one example, the audio signals are spoken words of the user of the electronic device 104.

The screen capture module 306, captures images at the electronic device 104. In one example, the screen capture module 306 captures frames of images presented on a display of the electronic device 104. The screen capture module 306 may store the frames of images in the memory 126. In one example, the frames of images are images of browser windows displaying shopping pages or items in a party bin.

The capture selection module 308, identifies the captured information to send to the backend system 102 for distribution to the other users. In one example, the capture selection module 308 identifies captured information to send responsive to the activities of the user (e.g., as determined by the user activity module 314; described below). In accordance with this example, the capture selection module 308 selects the captured camera images when the user is viewing a social screen and selects captured frames of images when browsing for items or viewing a shopping bin.

The communication module 310, sends communications to the backend system 102 for distribution to the other party goers and receives communication from the backend system 102 for presentation by the electronic device 104. In one example, the communication module 310 may additionally establish private communications with one or more party goers. The communication module 310 may add an indicator (based on, for example, a signal from the capture selection module 308) to frames of video indicating whether the frames of video are from the user's camera or from the user's display.

The presentation module 312, presents communications on the electronic device 104. The presentation module 312 presents video signals on the display of the electronic device 104. In one example, the presentation module 312 presents video signals from the camera of the user's electronic device in a main display area and captured camera frames or captured browser frames from remote users in respective PIPs for those users. The presentation module 312 may present associated images of the users adjacent or on their respective PIPs when captured browser frames are received from remote user images (e.g., responsive to an indicator added by the communication module 310 of the remote user).

The user activity module 314 determines current user activity. In one example, the user activity module 314 monitors the presentation layer to determine what activity the user is performing. If the presentation layer is presenting images from the camera of the electronic device 104, the user activity module 314 determines the user is viewing a social screen. If the presentation layer is presenting a browser screen, on the other hand, the user activity module 314 determines the user is shopping or viewing a shopping bin. In another example, the user activity module 314 monitors user selections. In accordance with this example, the user activity may initially default to a social screen. Thereafter, as the user selects navigation buttons (described below), the user activity will adjust responsive the button selections.

The purchase module 316 presents incentives to the user and receives payment information to purchase items in the user's shopping cart. In an example, the purchase module 316 communicates with the checkout module 210 using a secure encryption channel to complete purchases.

Figure 4A:
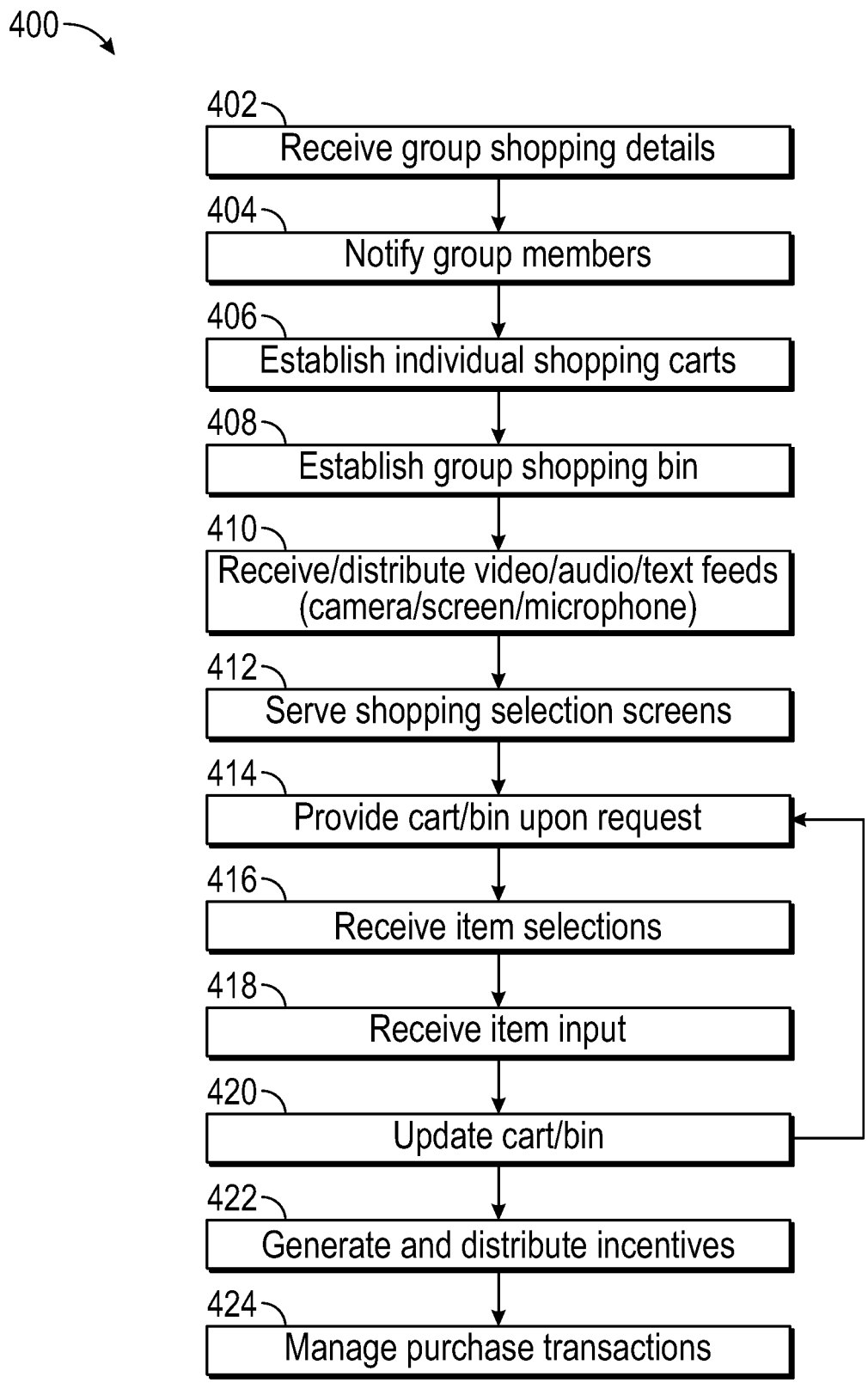
FIG. 4A is a flow chart of example steps for implementing the backend system of FIG. 2.
Figure 4B:
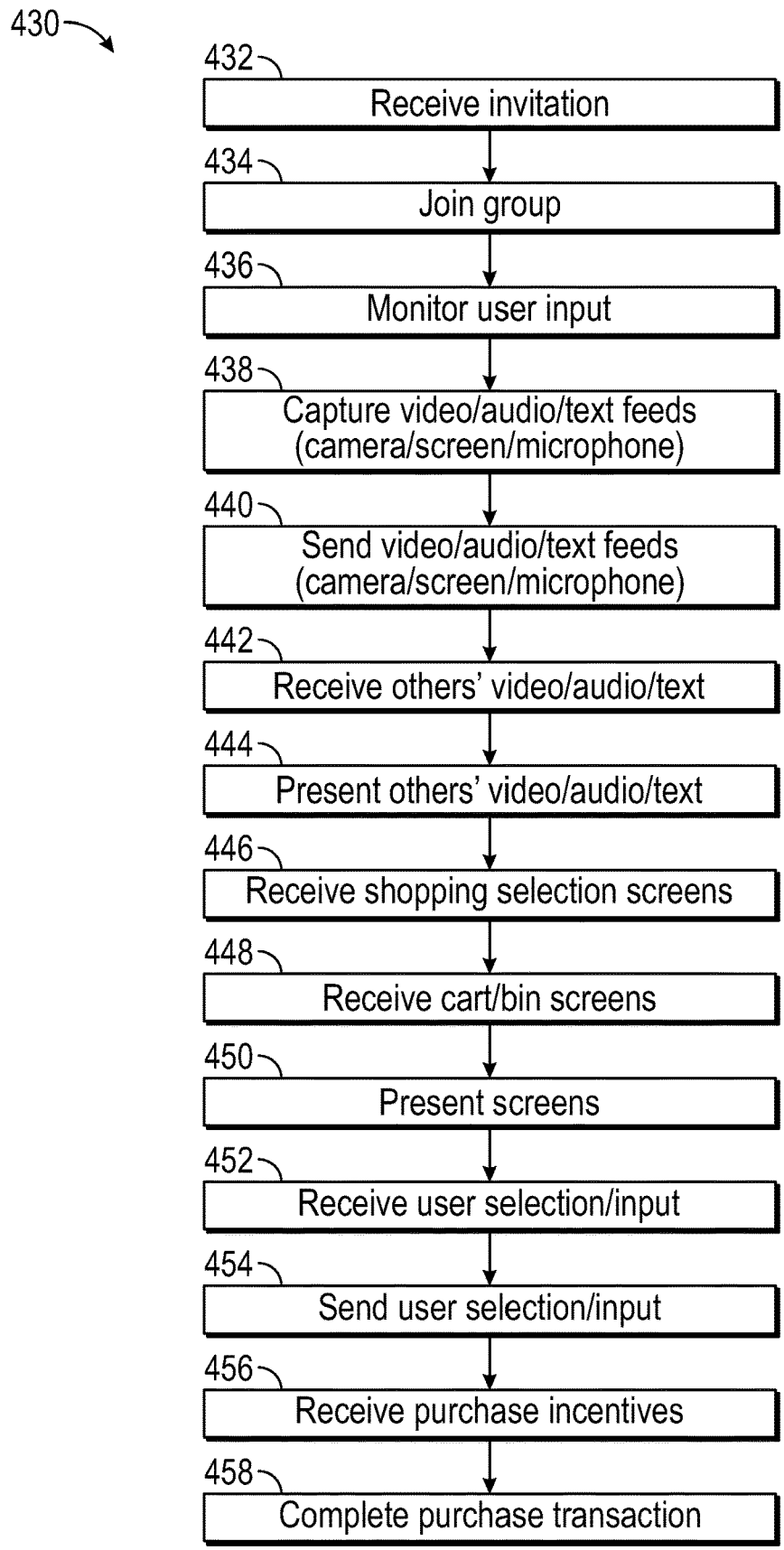
FIGS. 4B, 4C, and 4D are a flow charts of example steps for implementing the client-side system of FIG. 3.
Figure 4C:
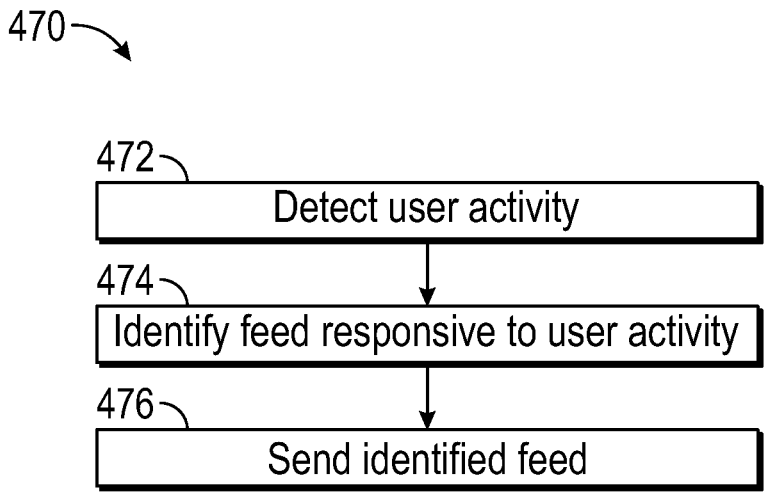
Figure 4D:
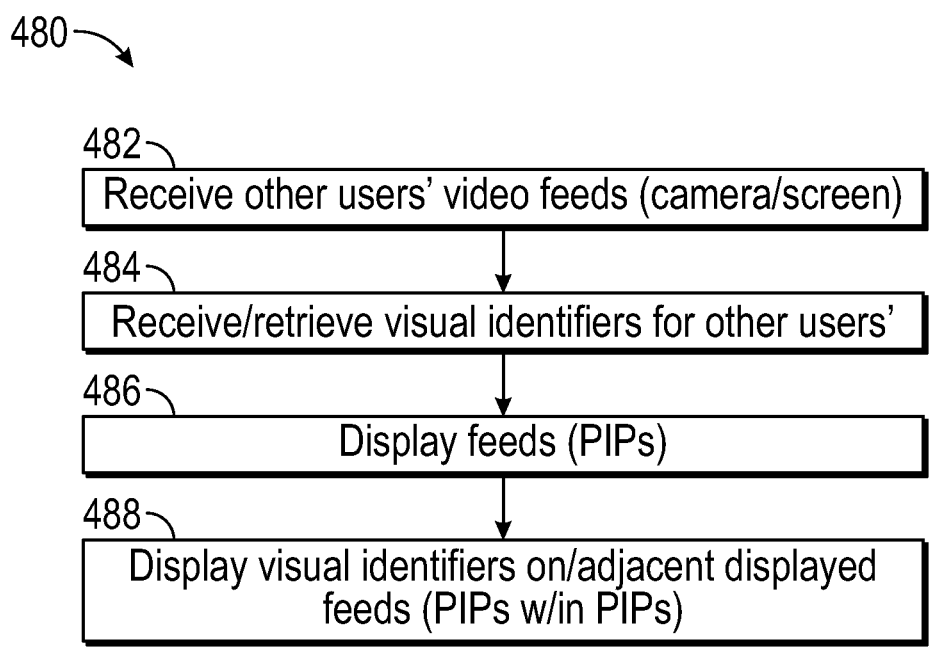

FIG. 4A is a flow diagram illustrating an example method 400 for performance by the backend system 102 to carry out functionality described herein, FIG. 4B is a flow diagram illustrating an example method 430 for performance by an electronic device to carry out functionality described herein, FIG. 4C is a flow diagram illustrating an example method 470 sending an appropriate video feed from an electronic device 104 for delivery to other electronic devices 104, and FIG. 4D is a flow diagram illustrating an example method 480 for displaying images of other user activity on a user electronic device 104. Although the below description of the methods refers to the shopping system 100, other systems for group shopping will be understood from the description herein. The flowcharts may describe the operations as a sequential process, however, many of the operations can be performed in parallel or concurrently. In addition, the order of the operations may be re-arranged. A process is terminated when its operations are completed. A process may correspond to a method, a procedure, etc. The steps of a method may be performed in whole or in part, may be performed in conjunction with some or all of the steps in other methods, and/or may be performed by any number of different systems, such as the systems described in FIGS. 1, 2, 3, 5A-E, 6A, 6B, and 7-10.

At block 402, the backend system 102 receives group shopping details. The group shopping details include host information (name and user ID), guest information (e.g., names and user IDs), and party details (e.g., date, start time, duration, theme, collection(s), etc.). In one example, details are gathered from the electronic device 104 of the host through the network 106 using the invitation module 202. In one example, the host is provided with an Invite button that, when selected, results in the presentation of fields on the electronic device of the user for entering identification information for a guest. One or more collections (e.g., women and beauty and wellness) may be selected by the host from a plurality of collections to focus the attention of the party and guests. In one example, the host may add additional collections during the party, e.g., in response to interest from party goers.

In one example, the host can remove people from the guest list on the event page before the party starts and during the party (e.g., if a person does not join the video call). In one example, the number of guests is limited to a predefined number (e.g., 4 guests). In accordance with this example, when all invited guests RSVP YES, the host sees a disabled Invite button. If someone changes the RSVP to NO, the host sees an enabled Invite button again and can identify another user to receive a link to the party.

At block 404, the backend system 102 notifies group members, e.g., the host and the guests, of the party details. In one example, the backend system 102 sends a link (e.g., via the app, SMS messaging, or an email) for joining the party along with the party details. Notifications may be sent using the invitation module 202.

At block 406, the backend system 102 establishes individual shopping carts for the host and guests and, at block 408, the backend system 102 establishes a shopping bin (e.g., a collection of shopping carts for the group). The shopping carts and bin may be maintained using the cart module 206. In one example, the shopping bin includes all details of all items in the shopping carts of all party goers. In another example, the backend system 102 only pulls select information from the shopping carts and omits information that may be sensitive (e.g., size or price). In another example, the host or guest may identify one or more items in their cart as private (e.g., when adding to the cart) and those items are omitted from the shopping bin. Where the host or a guest is currently shopping and has items in a shopping cart when they join the party, the host or guest is provided with an option to move items in their shopping cart to a holding area (i.e., save for later) or into a party shopping bag where they are viewable by other party goers.

In one example, guests may participate in multiple parties that overlap. Hosts can create multiple parties with overlapping times (e.g., Party A is on 12/1 @ 1-3 pm EST and Party B is on 12/1 @ 2-4 pm EST). Guests can RSVP 'yes' to multiple parties with overlapping times. A guest can leave Party A and join Party B. In one example, however, a guest cannot join Party B while they are currently in Party A. A guest with 1 device cannot join Party A and Party B simultaneously at 2 pm EST. However, a guest with 2 devices could join Party A on device-a and Party B on the device-b at 2 pm EST. A guest with 2 devices cannot join Party A on device-a and Party A on device-b.

At block 410, the backend system 102 receives and distributes communications from the host and guests. Communications may be video (e.g., from a user's camera or display), audio (e.g., from a user's microphone), text (e.g., typed on a user interface), or a combination thereof. In an example, communication are coordinated using the invitation module 202.

At block 412, the backend system 102 serves shopping selection screens (e.g., from the store 108). In one example, the backend system 102 serves shopping selection screens as web pages responsive to user input (e.g., selections and scrolling) for display on the display of the user's electronic device 104.

At block 414, the backend system 102 the provides the shopping cart of the user or a shopping bin for the host and all the guests. The shopping cart and shopping bin are provided in response to a user selection received from an electronic device of the user.

At block 416, the backend system 102 receives item selections from a user. The backend system 102 places the selected items in a shopping cart of a user.

At block 418, the backend system 102 receives item input. In one example, items present in the shopping bin include a selectable indicator (e.g., a heart-shaped indicator) associated with (e.g., on or adjacent) an image or description of the item. The backend system 102 receives item input when a user selects the selectable indicator associated with an item.

At block 420, the backend system 102 updates the shopping carts and shopping bin responsive to received sections and input (blocks 416 and 418). In one example, the backend system 102 maintains a counter (e.g., in memory 116) for each item that is incremented when the selectable indicator associated with that item is selected. In accordance with this example, a count value may be displayed adjacent or on the item to provide a user with feedback from other users on her selection. The backend system 102 continuously updates the carts/bin based on user selections and input and provides the updated carts/bin to the host and guests.

At block 422, the backend system 102 generates and distributes incentives. The backend generates and distributes the incentives during the party or when a user is completing a purchase. The incentives may be, by way of non-limiting example, a discount off entire purchase or a free gift on purchases over a threshold value. In one example, a party discount code (e.g., for 15% off) is automatically applied to the carts of all participants once at least 2 people have joined (they do not have to be in the party at the same time). The party discount code may be valid for the duration of the party plus a 30 minute grace period after the end of the party (regardless of whether or not a user is on the call).

At block 424, the backend system 102 manages purchase transactions. In an example, the checkout module 210 communicates with the purchase module 316 using a secure encryption channel to complete purchases.

At block 432, the electronic device 104 receives an invitation. In one example, the electronic device 104 received an invitation including a link from the backend system 102 (e.g., via the app, SMS messaging, or an email) for joining the party along with the party details.

At block 434, the electronic device 104 joins the group. In one example, the user of the electronic device selects a previously received link (block 432) during the designated party time. The electronic device 104, in response to the selection, establishes communication with the backend system 102 to join the party using information contained in the received link.

At block 436, the electronic device 104 monitors user input. The electronic device monitors user interactions received via the display 104 or other user interfaces 122. User input includes button selections and text entry.

At block 438, the electronic device 104 captures communication information. Communications may be video (e.g., from a user's camera or display), audio (e.g., from a user's microphone), text (e.g., typed on a user interface), or a combination thereof. Video may be captured via video capture module 302 and the screen capture module 306. Audio may be captured via the audio capture module 304.

At block 440, the electronic device 104 sends communications to the backend system 102 for distribution to the other party goers. In an example, the electronic device 104 selectively sends communication to the backend system 102 responsive to the user's actions or current activity. Capture selection module 308 may identify the captured information to send to the backend system 102 for distribution to the other users.

FIG. 4C depicts a flowchart 470 of example steps for selectively sending communications (e.g., a camera feed including video frames from a camera or a display feed including video frames of the display). At block 472, the electronic device 104 detects user activity. The processor 124 of the electronic device 104 may detect that the user is viewing a social screen (e.g., based on an indicator identified in the presentation layer or in response to the user selecting a button that presents the social screen to the user). The electronic device 104 may additionally detect that user is viewing a shopping screen or a shopping bin (e.g., based on another indicator(s) in the presentation layer or in response to the user selecting a button(s) that presents the shopping screen or the shopping bin to the user). At block 474, the electronic device 104 identifies a feed to send responsive to the detected activity. For example, the electronic device 104 may select the captured camera images when the user is viewing a social screen and may select captured frames of images when browsing for items or viewing a shopping bin. At block 476, the electronic device sends the identified feed.

Referring back to FIG. 4B, at block 442, the electronic device 104 receives communications from other party goers from the backend system 102. The processor 124 may receive communications from other party goers through the backend system 102 via network 106 and TX/RX 128.

At block 444, the electronic device 104 presents the received communications. Video and textual communications are presented on the display and audio communications are presented by speakers.

FIG. 4D depicts a flow chart of example steps 480 for presenting video feeds from the other users. At block 482, video feeds are received from the other users. For each of the other users, the video feed may be a camera feed (e.g., a video of that user) or a screen display feed (e.g., what is being displayed by the electronic device 104 of that user). At block 484, visual identifiers for each of the other users is received. In one example, the visual identifiers are a still image retrieve prior to or at the beginning of the party (e.g., as a default image in the event a camera feed is not obtained. In another example, the visual identifiers are the video fees received at block 482 and the step of block 484 may be omitted. At block 486, the received feeds from each user are presented. The electronic device 104 may present the feeds on the display in respective PIPs. At block 488, the received visual identifiers for each user are presented. The electronic device 104 may present the visual identifiers for each user on the display on or adjacent the respective PIP of that user.

Referring back to FIG. 4B, at block 446, the electronic device 104 receives shopping selection screens. The shopping selection screens are received responsive to user selections (e.g., by selecting a corresponding icon associated with a shopping screen presented on the display 104).

At block 448, the electronic device 104 receives a shopping cart screen of the user and a shopping bin screen for the group. The shopping cart screen and the shopping bin screen are received responsive to user selections (e.g., by selecting a corresponding icon associated with those screens presented on the display).

At block 450, the electronic device 104 presents the received shopping cart screen or shopping bin screen. The electronic device 104 may present the screens on the display 120.

At block 452, the electronic device 104 receives user selections and inputs. The electronic device 104 may receive user input via the display 120 (e.g., a touchscreen) or via another user interface 122.

At block 454, the electronic device 104 sends user selections and input to the backend system 102. The processor 124 may send the user selections and input to the backend system 102 via TX/RX 128 and network 106.

At block 456, the electronic device 104 receives purchase incentives. The processor 124 may receive purchase incentives from the backend system 102 via network 106 and TX/RX 128.

At block 458, the electronic device 104 completes a purchase transaction for items in their cart. The processor 124 may complete the transaction by executing instructions in purchase module 316, which interfaces with the backend system 102 running the checkout module 210 to complete the purchase transaction.

FIGS. 5A-5E depict GUIs on a user's electronic device 104. A video call/social display GUI 500a is depicted in FIG. 5A. The GUI 500a may be an initial GUI presented to a user upon joining a party. The GUI 500a includes a main display area 502 depicting an image of the user of the electronic device 104. The GUI 500a additionally includes a PIP display area including a plurality of PIP images 504 (two PIP images in FIG. 5A). Each of the PIP images corresponds to a remote user. In FIG. 5A, a live video feed originating from each of the two remote users is presented in the PIP images.

The GUI 500a additionally includes a plurality of the selectable configuration and navigation icons 506. The configuration icons include a video on/off icon (for controlling whether a live video signal is sent), a sound/audio on/off icon (for controlling whether a live audio signal is sent, and a hide and show icon (for showing and hiding the selectable icons). The navigation icons including a party shopping bag icon (for navigating to shopping cart and bin screens), a flip/shopping icon (for navigating to an initial shopping screen), and a party icon (for navigating to a video call/social screen).

The GUI 500a also includes a chat area 508 for presenting textual comments originating from remote users and for entering text for distribution to remote users. On or adjacent the chat area 508, brief messages may be displayed such as "[username A] liked an item in your bag," "[username A] liked an item in [username B's] bag," "[username] joined the party," and "[username] left the party." Brief messages may be selected and assembled from predefined messages retrieved by the backend system 102 and updated to include relevant information determined by the backend system 102 from input received from the users (e.g., in response to their selection of selectable icons). A selectable end icon 510 is also available to leave the party.

The GUI 500b in FIG. 5B depicts an initial shopping screen in the display area 502. As depicted in FIG. 5C a banner 520 may be displayed when on the shopping screen to remind the user that their screen information is being sent to the other remote users. When a remote user such as a third remote user 522 is shopping, their camera capture video feed in the PIP is replaced by a video feed from the display of their electronic device. A small still image of the remote user 524 or their camera feed may be displayed on or adjacent their respective PIP so that other users know which user is participating in what activity (e.g., video chatting, shopping, or viewing the shopping bin). FIG. 5D depicts a GUI 500d displayed on a user's electronic device 104 including a video feed of a selected remote user in the main display area 502. The user may display the remote user in the main display area 502 by selecting the PIP of that user (which pins the video feed to the main display area 502. The user may return to their own image by unpinning the remote user. FIG. 5E depicts a GUI 500e including a shopping screen in the main display area 502.

Figure 6A:
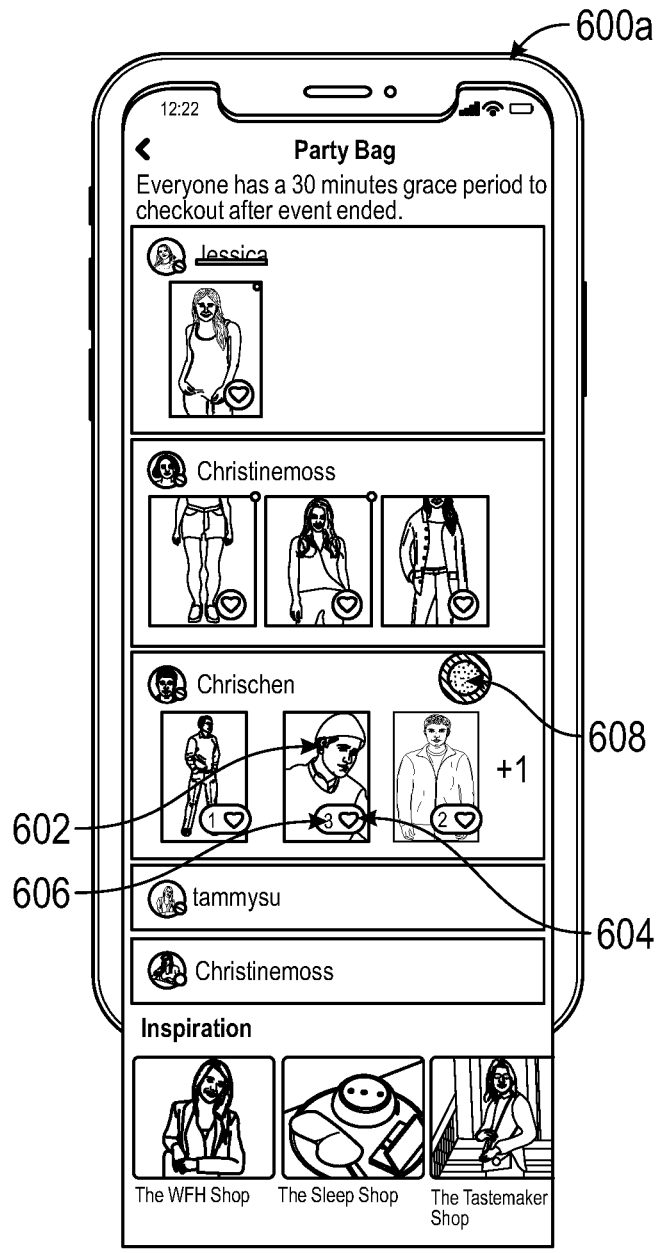
FIG. 6A is an example GUIs depicting a shopping bin including items in shopping carts of all users.
Figure 6C:
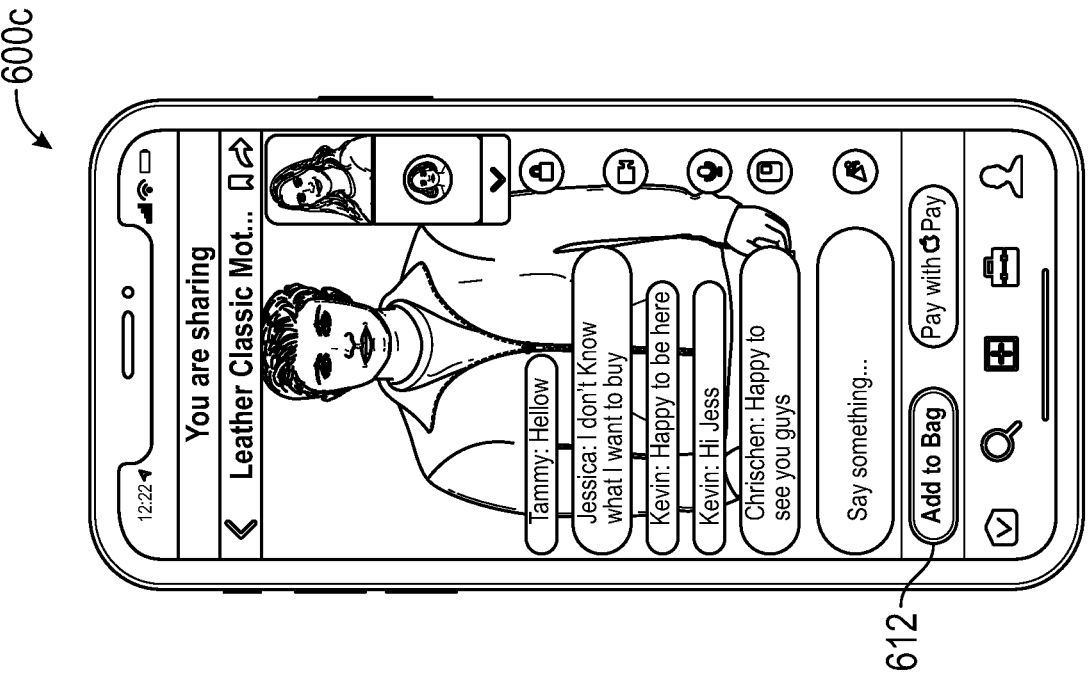
FIGS. 6B and 6C are example GUIs depicting items in another users shopping cart.
Figure 6B:
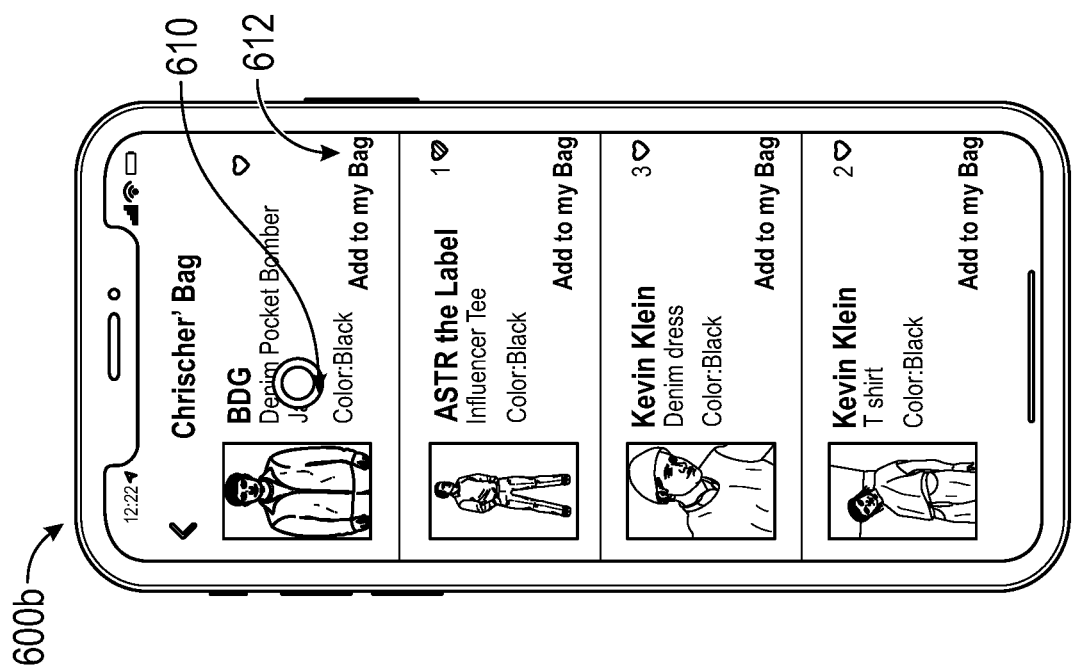

FIGS. 6A-6C depict shopping bin/cart GUIs on a user's electronic device 104. GUI 600a displays a shopping bin (the "party bag"). The shopping bin includes the items selected by each of the user so others can view and comment on what other users are considering for purchase. Each item (e.g., item 602) may have a selectable indicator (e.g., heart 604). The selectable indicator may include a counter 606 on or adjacent the selectable indicator. The backend system 102 may track the number of times a distinct remote user selects the selectable indicator and increment the counter to provide feedback to the user about what other users think about that item for that user.

GUI 600b depicts a more detailed view of a particular user's selections. The more detailed view may be accessed by selecting that user in the shopping bin (e.g., by a finger tap 608 in an area adjacent the user or the user's items). GUI 600c depicts a detailed view of a particular item. The detailed view of the particular item may be accessed by selecting that item in the more detailed view presented in GUI 600b (e.g., by a finger tap 610 in an area adjacent the item). The backend system may present the use with an option to add the items to their own bag, e.g., by selecting an add to bag icon 612 with a finger tap.

Figure 7:
FIG. 7 is an example GUI depicting a shopping cart of the user at checkout.

FIG. 7 depicts an individual shopping cart GUI 700 at checkout on a user's electronic device 104. The GUI 700 includes an incentive 702, details about the user's items being purchased, and checkout options.

Figure 8:
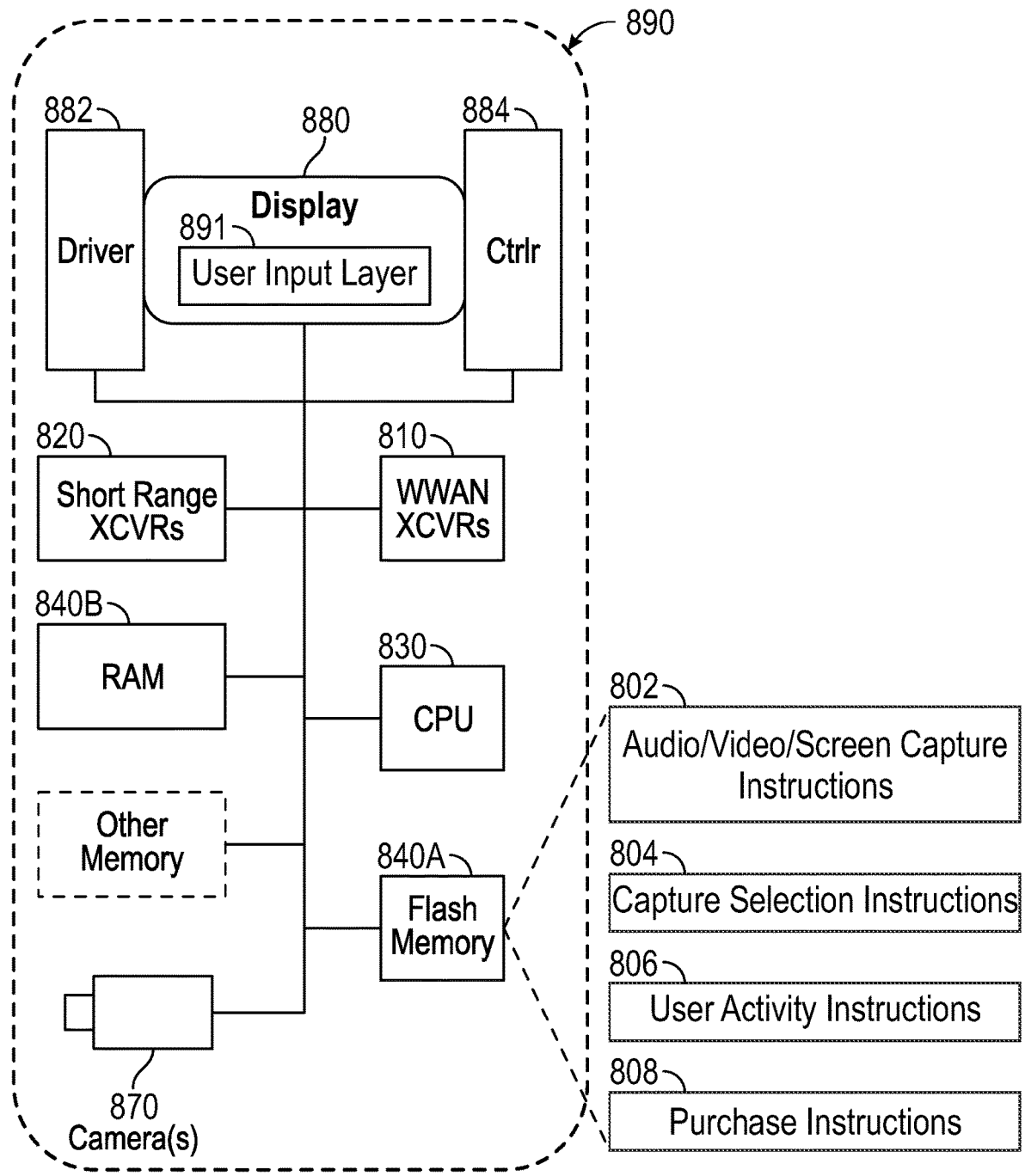
FIG. 8 is a diagrammatic representation of an example hardware configuration for a client device embodied as a mobile device.

FIG. 8 is a high-level functional block diagram of an example electronic devices 104 embodied as an example mobile device 890 that includes the client system 300. Mobile device 890 includes a flash memory 840A which includes programming to perform all or a subset of the functions described herein for the client system 300. Programming includes, by way of non-limiting example, audio/video/screen capture instructions 802 for capturing information at the electronic device 104, capture selection instructions 804 for selecting captured information to send to the backend system 102 (e.g., camera capture frames or display frames), user activity instructions 806 for determining what the user is currently doing (e.g., based on information in a presentation layer, input selections by the user, or a combination thereof), and purchase instructions 808 to enable secure checkout of items in a user's cart. Mobile device 890 can include a camera 870 that comprises a visible light camera. Memory 840A may further include multiple images or video, which are generated via the camera 870.

As shown, the mobile device 890 includes an image display 880, an image display driver 882 to control the image display 880, and a controller 884. In the example of FIG. 8, the image display 880 and a user input device are integrated together into a touch screen display.

Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 8 therefore provides block diagram illustrations of the example mobile device 890 having a touch screen display for displaying content and receiving user input as (or as part of) the user interface.

As shown in FIG. 8, the mobile device 890 includes at least one digital transceiver (XCVR) 810, shown as WWAN XCVRs, for digital wireless communications via a wide area wireless mobile communication network. The mobile device 890 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11.

The transceivers 810, 820 (network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web related inputs, and various types of mobile message communications to/from the mobile device 890.

The mobile device 890 further includes a microprocessor, shown as CPU 830, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 830, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 830 or processor hardware in smartphone, laptop computer, and tablet.

The microprocessor 830 serves as a programmable host controller for the mobile device 890 by configuring the mobile device 890 to perform various operations, for example, in accordance with instructions or programming executable by processor 830. For example, such operations may include various general operations of the mobile device, as well as operations related to implementing a multi-user shopping experience. Although a processor may be configured by use of hardwired logic, typical processors in mobile devices are general processing circuits configured by execution of programming.

The mobile device 890 includes a memory or storage device system, for storing data and programming. In the example, the memory system may include a flash memory 840A and a random access memory (RAM) 840B. The RAM 840B serves as short term storage for instructions and data being handled by the processor 830, e.g., as a working data processing memory. The flash memory 840A typically provides longer term storage.

Hence, in the example of mobile device 890, the flash memory 840A is used to store programming or instructions for execution by the processor 830. Depending on the type of device, the mobile device 890 stores and runs a mobile operating system through which specific applications, including programming for the benchmark scheduler 208 and the feature gate 210 are executed. Applications, such as benchmark applications and programming for the benchmark scheduler 208 and the feature gate 210, may be a native application, a hybrid application, or a web application (e.g., a dynamic web page executed by a web browser) that runs on mobile device 890. Examples of mobile operating systems include Google Android, Apple iOS (I-Phone or iPad devices), Windows Mobile, Amazon Fire OS, RIM BlackBerry operating system, or the like.

Figure 9:
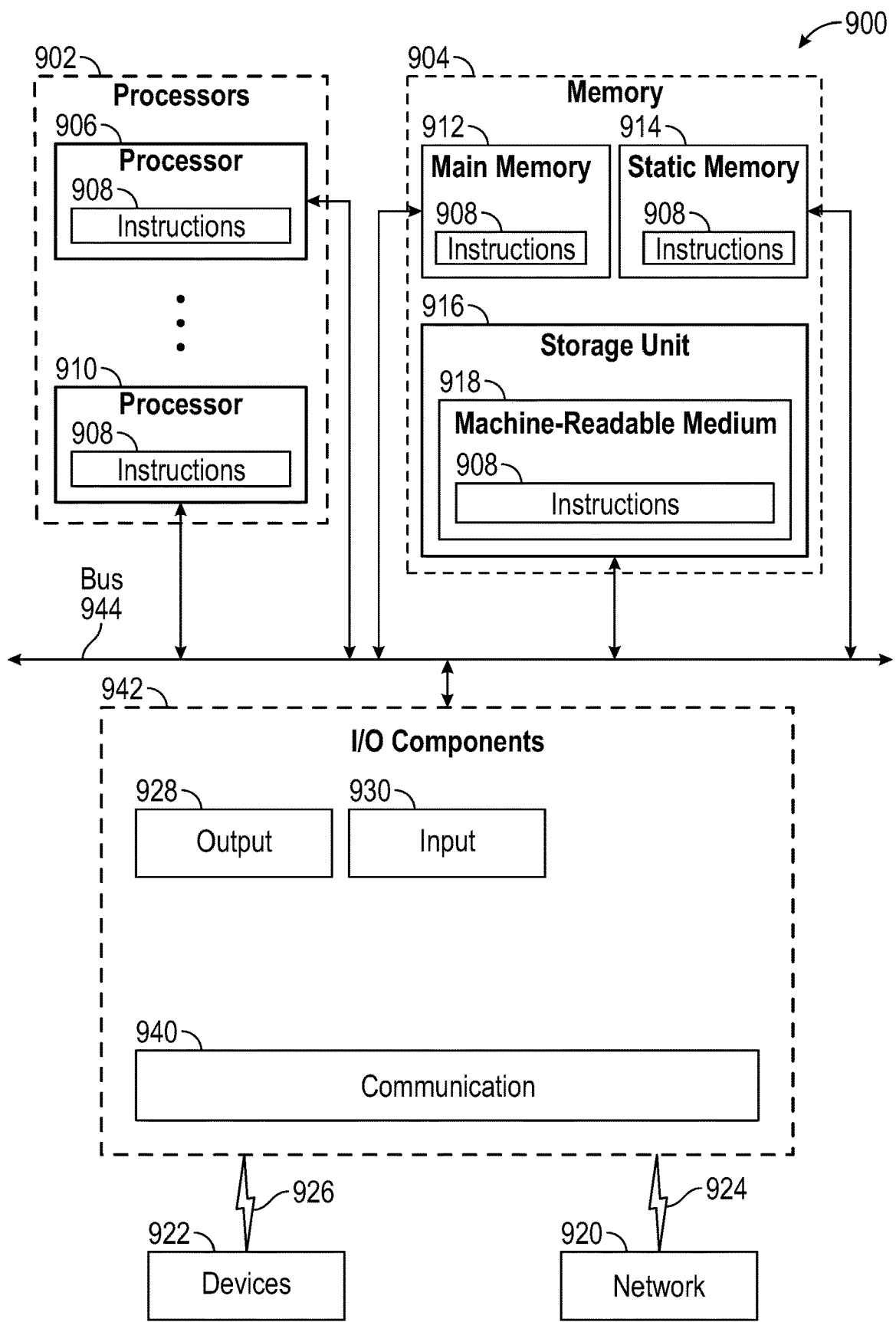
FIG. 9 is a diagrammatic representation of a machine in the form of a computer system within which a set of instructions may be executed for causing the machine to perform any one or more of the methodologies described herein, in accordance with some examples.

FIG. 9 is a diagrammatic representation of a machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment.

The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, all accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

Communication may be implemented using a wide variety of technologies. The I/O components 942 further include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 922 may be another machine or any of a wide variety of peripheral devices (e.g., a peripheral device coupled via a USB).

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 10:
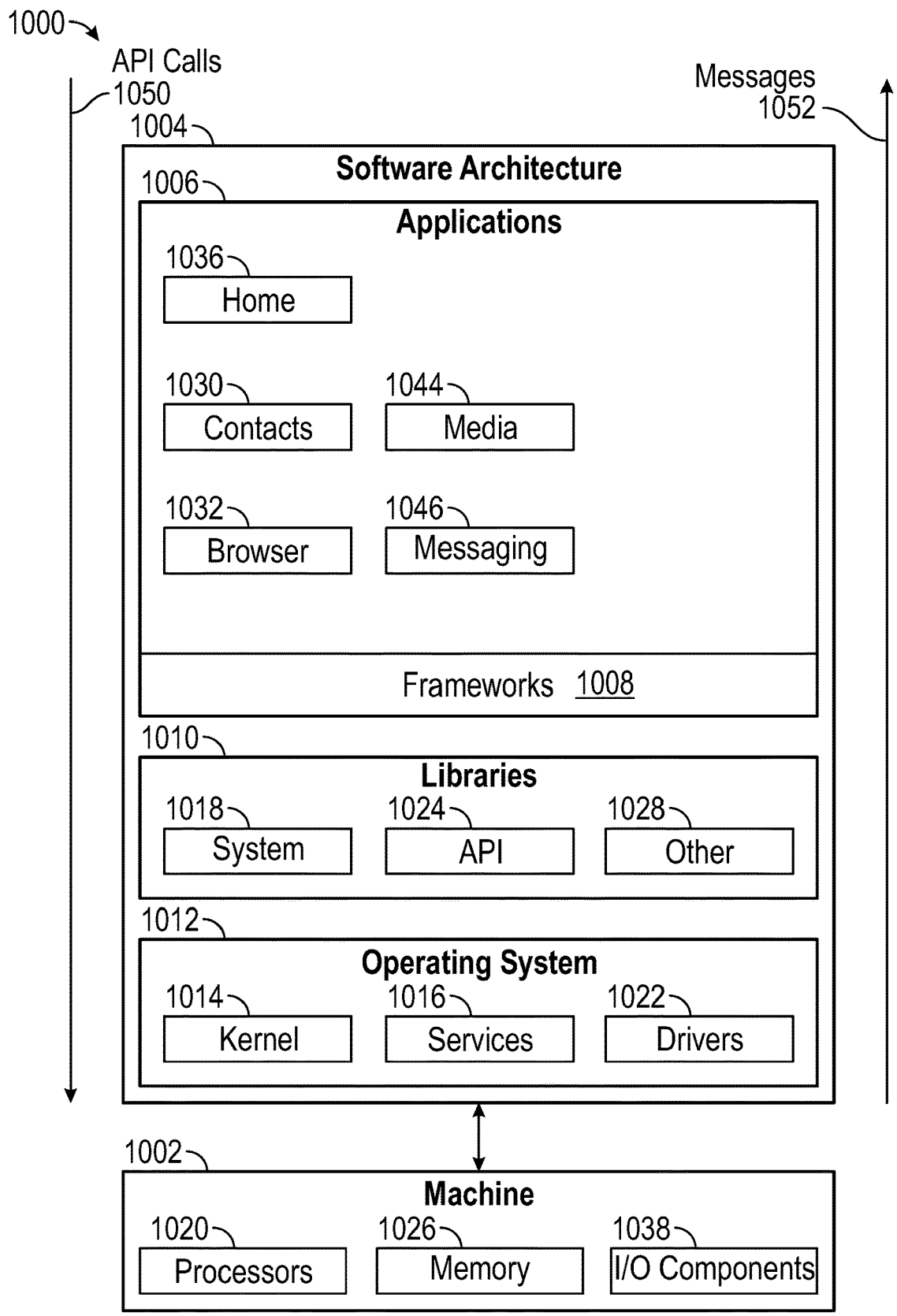
FIG. 10 is block diagram showing a software architecture within which aspects of the present disclosure may be implemented, in accordance with some examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a media application 1044, and a messaging application 1046. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, a third-party application can invoke the API calls 1050 provided by the operating system 1012 to facilitate functionality described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g., approximate, substantially, or about), may vary by as much as ±10% from the recited amount.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. A shopping application for participating in a multi-user shopping experience including a plurality of users, the shopping application for each user comprising:
    a video capture module configured to capture images of a user via a camera of an electronic device of the user;
    a screen capture module configured to capture display images presented on a display of the electronic device of the user;
    an activity detection module configured to detect a current activity of the user, wherein the current activity is one of viewing a social screen, viewing a shopping screen, or viewing a shopping bin;
a communication module configured to receive remote user images and remote display images from others of the plurality of users;
a selection module configured to select the captured user images or the captured display images to send via the communication module responsive to the detected current activity; and
a display module configured to present the received remote user images and remote display images on the display of the electronic device.

2. The shopping application of claim 1, further comprising:
an audio capture module configured to capture a user audio signal via a microphone of the electronic device of the user; and
a presentation module configured to present remote user audio signals received via the communication module.

3. The shopping application of claim 1, further comprising:
a text messaging module configured to send text messages from the user and receive remote text messages from the others of the plurality of users via the communication module and to present the text messages and remote text messages on the display via the display module.

4. The shopping application of claim 1, wherein the current activity is selected from a group comprising chatting, shopping, and viewing a collective shopping bin for the plurality of users and wherein the selection module selects the captured user images to send when the current activity is chatting and selects the captured display images to send when the current activity is shopping or viewing a collective shopping bin.

5. The shopping application of claim 1, wherein the communication module is further configured to receive a collective shopping bin including all items selected by all users and the display module is configured to present the collective shopping bin responsive to a shopping cart selection by the user.

6. The shopping application of claim 5, wherein the display module is further configured to present a selectable indicator on or adjacent each item in the collective shopping bin for selection by the user, wherein user selections are sent via the communication module for aggregation and display in the collective shopping bin.

7. The shopping application of claim 1, further comprising:
a purchase module configured to enable a user to purchase items selected by the user, wherein the purchase module presents the user with an incentive to purchase the selected items during the multi-user shopping experience.

8. The shopping application of claim 1, wherein the display module is configured to present the user image in a display area of the display and to present, for each remote user, the received camera image or display image for that remote user in a respective picture in picture (PIP).

9. The shopping application of claim 8, wherein the display module is further configured to overlay a respective still image of the remote user on the received display image.

10. A shopping method for participating in a multi-user shopping experience including a plurality of users, the shopping method for each user comprising:
capturing images of a user via a camera of an electronic device of the user;
capturing display images presented on a display of the electronic device of the user;
detecting a current activity of the user, wherein the current activity is one of viewing a social screen, viewing a shopping screen, or viewing a shopping bin;
selecting the captured user images or the captured display images to send responsive to the detected current activity;
receiving remote user images and remote display images from others of the plurality of users; and
presenting the received remote user images and remote display images on the display of the electronic device.

11. The shopping method of claim 10, further comprising:
capturing a user audio signal via a microphone of the electronic device of the user; and
presenting received remote user audio signals.

12. The shopping method of claim 10, further comprising:
sending text messages from the user;
receiving remote text messages from the others of the plurality of users; and
presenting the text messages and the remote text messages on the display.

13. The shopping method of claim 10, wherein the current activity is selected from a group comprising chatting, shopping, and viewing a collective shopping bin for the plurality of users and wherein the selecting selects the captured user images to send when the current activity is chatting and selects the captured display images to send when the current activity is shopping or viewing the collective shopping bin.

14. The shopping method of claim 10, further comprising:
receiving a collective shopping bin including all items selected by all users; and
presenting the collective shopping bin responsive to a shopping cart selection by the user.

15. The shopping method of claim 14, wherein the display module is further comprising:
presenting a selectable indicator on or adjacent each item in the collective shopping bin for selection by the user, wherein user selections are sent for aggregation and display in the collective shopping bin.

16. The shopping method of claim 10, further comprising:
enabling a user to purchase items selected by the user; and
presenting the user with an incentive to purchase the selected items during the multi-user shopping experience.

17. The shopping method of claim 10, further comprising:
presenting the user image in a display area of the display; and
presenting, for each remote user, the received camera image or display image for that remote user in a respective picture in picture (PIP).

18. The shopping method of claim 17, further comprising:
overlaying, for at least one of the remote users, a respective still image of the at least one of the remote user upon receipt of the received display image of that remoter user.

19. A multi-user on-line shopping method for purchasing items from an on-line marketplace, the method comprising:
receiving camera capture frames or screen capture frames from electronic devices of each of a plurality of users responsive to current activities of the plurality of users, the camera capture frames received from at least a first of the plurality of users and the screen capture frames received from at least a second of the plurality of users, wherein the current activity of each of the plurality of users is one of viewing a social screen, viewing a shopping screen, or viewing a shopping bin; and distributing the received camera capture frames and screen capture frames received from the electronic devices of each of the plurality of users to the electronic devices of all others of the plurality of users to be simultaneously displayed.

20. The multi-user on-line shopping method of claim 19, further comprising:
identifying at least one incentive for the plurality of users the at least one incentive having at least one condition;
notifying the plurality of users of the at least one incentive; and
applying the at least one incentive to the purchases in compliance with the at least one condition.

\* \* \* \* \*